United States Patent
Wang et al.

(10) Patent No.: US 10,798,703 B2
(45) Date of Patent: Oct. 6, 2020

(54) POSITION OF UPLINK SHORT BURST IN NEW RADIO

(71) Applicant: QUALCOMM Incorporated, San Diego, CA (US)

(72) Inventors: Renqiu Wang, San Diego, CA (US); Wei Zeng, Cupertino, CA (US); Naga Bhushan, San Diego, CA (US); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 15/850,577

(22) Filed: Dec. 21, 2017

(65) Prior Publication Data
US 2018/0184424 A1    Jun. 28, 2018

Related U.S. Application Data

(60) Provisional application No. 62/437,988, filed on Dec. 22, 2016.

(51) Int. Cl.
*H04J 3/00* (2006.01)
*H04W 72/04* (2009.01)
(Continued)

(52) U.S. Cl.
CPC ....... *H04W 72/0446* (2013.01); *H04L 1/1671* (2013.01); *H04L 1/1854* (2013.01);
(Continued)

(58) Field of Classification Search
CPC ........... H04W 72/0446; H04W 72/042; H04W 72/14; H04W 72/1284; H04L 1/1671; H04L 1/1854; H04L 1/1893; H04L 5/0055
See application file for complete search history.

(56) References Cited

U.S. PATENT DOCUMENTS

2016/0270070 A1    9/2016  Mukkavilli et al.
2017/0111923 A1*   4/2017  Nogami ............ H04W 72/1263
(Continued)

FOREIGN PATENT DOCUMENTS

WO    WO-2017074489 A1    5/2017
WO    WO-2017074493 A1    5/2017

OTHER PUBLICATIONS

Samsung (UL control channel design, R1-1612529, Nov. 14-18, 2016). (Year: 2016).*

(Continued)

*Primary Examiner* — Maharishi V Khirodhar
(74) *Attorney, Agent, or Firm* — Arent Fox, LLP (57) ABSTRACT

Various aspects of the present disclosure provides methods and techniques for flexible positioning of a uplink short burst in NR communications. In one example, the uplink short burst may have a slot position that at any position of the uplink centric slot. For instance, a downlink centric slot may contain control signals from a base station, such as a grant, that indicate the slot position of the uplink short burst. The grant may indicate, explicitly or implicitly, the position within an uplink centric slot that should be assigned to an uplink short burst. The UE may then transmit a response including an uplink short burst within the indicated slot position of an uplink centric slot. The various aspects may thus enable the dynamic assignment of uplink short bursts within uplink centric slots.

30 Claims, 8 Drawing Sheets

(51) Int. Cl.
*H04W 72/14* (2009.01)
*H04L 5/00* (2006.01)
*H04L 1/18* (2006.01)
*H04L 1/16* (2006.01)
*H04W 72/12* (2009.01)

(52) U.S. Cl.
CPC .......... *H04L 1/1893* (2013.01); *H04L 5/0055* (2013.01); *H04W 72/042* (2013.01); *H04W 72/14* (2013.01); *H04W 72/1284* (2013.01)

(56) References Cited

U.S. PATENT DOCUMENTS

| | | | |
|---|---|---|---|
| 2017/0164366 A1 | 6/2017 | Zeng et al. | |
| 2017/0215204 A1 | 7/2017 | Sun et al. | |
| 2017/0272296 A1 | 9/2017 | Manolakos et al. | |
| 2017/0273071 A1* | 9/2017 | Nogami | H04W 72/0413 |
| 2018/0132264 A1* | 5/2018 | Jung | H04L 1/1812 |
| 2019/0141736 A1* | 5/2019 | Suzuki | H04W 72/0453 |

OTHER PUBLICATIONS

Ericsson (DL control for short TTI, R1-1610324, Oct. 10-14, 2016). (Year: 2016).*
ETRI: "Discussion on the Slot Structure in Time Domain," 3GPP Draft; R1-1609393, Discussion on the Slot Structure in Time Domain, 3rd Generation Partnership Project (3GPP), Mobile Competence Centre; 650, Route Des Lucioles; F-06921 Sophia-Antipolis Cedex; vol. RAN WG1, no. Lisbon, Portugal; Oct. 10, 2016-Oct. 14, 2016, Oct. 9, 2016, XP051149436, 4 pages, Retrieved from the Internet: URL:http://www.3gpp.org/ftp/Meetings_3GPP_SYNC_RAN1/Docs/ [retrieved on Oct. 9, 2016].
Huawei, et al., "Discussion on Timing Relations for NR," 3GPP Draft; R1-1608839, 3rd Generation Partnership Project (3GPP), Mobile Competence Centre; 650, Route Des Lucioles; F-06921 Sophia-Antipolis Cedex; France, vol. RAN WG1, no. Lisbon, Portugal; Oct. 10, 2016-Oct. 14, 2016, Oct. 9, 2016, XP051148893, 5 pages, Retrieved from the Internet: URL: http://www.3gpp.org/ftp/Meetings_3GPP_SYNC/RAN1/Docs/ [retrieved on Oct. 9, 2016].
Intel Corporation: "Frame Structure Design for NR," 3GPP Draft; R1-166555 Intel NR Frame Structure, 3rd Generation Partnership Project (3GPP), Mobile Competence Centre; 650, Route Des Lucioles; F-06921 Sophia-Antipolis Cedex; France, vol. RAN WG1, no. Gothenburg, Sweden; Aug. 22, 2016-Aug. 26, 2016, Aug. 21, 2016, XP051125447, 8 pages, Retrieved from the Internet: URL: http://www.3gpp.org/ftp/Meetings_3GPP_SYNC/RAN1/Docs/ [retrieved on Aug. 21, 2016].
Intel Corporation: "Subframe Structure for NR Dynamic TDD," 3GPP Draft; R1-1612005, Subframe Structure for NR Dynamic TDD, 3rd Generation Partnership Project (3GPP), Mobile Competence Centre; 650, Route Des Lucioles; F-06921 Sophia-Antipolis Cedex; France, vol. RAN WG1, no. Reno, Nevada, USA; Nov. 14, 2016-Nov. 18, 2016, Nov. 13, 2016, XP051175969, 8 pages, Retrieved from the Internet: URL: http://www.3gpp.org/ftp/Meetings_3GPP_SYNC/RAN1/Docs/ [retrieved on Nov. 13, 2016].
International Search Report and Written Opinion—PCT/US2017/068146—ISA/EPO—dated Jun. 7, 2018.

* cited by examiner

POSITION OF UPLINK SHORT BURST IN NEW RADIO

CLAIM OF PRIORITY 35 U.S.C. § 119

The present application for patent claims priority to Provisional Application No. 62/437,988 entitled "Position of Uplink Short Burst in New Radio" filed Dec. 22, 2016, which is assigned to the assignee hereof, and incorporated herein by reference in its entirety.

BACKGROUND

Aspects of the present disclosure relate generally to wireless communication networks, and more particularly, transmission of uplink short burst.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, position of uplink short burst is important to provide flexibility for data transmissions.

SUMMARY OF THE INVENTION

The present disclosure provides flexible positioning of a uplink short burst in NR communications. In one example, the uplink short burst may be located at any position of an uplink centric slot. For example, such slot position may be at the beginning (e.g., front) of the uplink centric slot, and/or in the middle, and/or at any position other than the end, and/or at the end. In some cases, an additional uplink short burst also may be included at the end. In other aspects, a downlink centric slot may contain control signals from a base station, including an implicit or explicit indicator of a slot position within the uplink centric slot that should be assigned to the uplink short burst. For example, the implicit indicator may be an indicator inferred by the UE based on a position of a physical downlink control channel (PDCCH) grant in the downlink centric slot, while the explicit indicator may be an indicator value within downlink control information (DCI) received in the downlink centric slot. The UE may receive the indicator and transmit the uplink short burst within the designated slot position of an uplink centric slot. The various aspects may thus enable the dynamic assignment of uplink short bursts within uplink centric slots.

In an aspect, the disclosure provides a method of configuring a uplink short burst in wireless communications, between a base station and a user equipment. The method may include receiving, at a user equipment (UE), a physical downlink control channel (PDCCH) grant associated with a first transmission received from an eNB, wherein the PDCCH grant indicates a slot position of an uplink short burst, and transmitting the uplink short burst in an uplink centric slot, wherein the slot position of the uplink short burst is located at any position of the uplink centric slot In another aspect, the disclosure provides a UE for wireless communications. The UE may include a transceiver, a memory, and a processor communicatively coupled with the transceiver and the memory. The processor and the memory may be configured to receive a PDCCH grant associated with a first transmission received from an eNB, wherein the PDCCH grant indicates a slot position of an uplink short burst, and transmit the uplink short burst in an uplink centric slot, wherein the slot position of the uplink short burst is located at any position of the uplink centric slot.

In another aspect, the disclosure provides another UE for wireless communications. The UE may include means for receiving a PDCCH grant associated with a first transmission received from an eNB, wherein the PDCCH grant indicates a slot position of an uplink short burst, and transmitting the uplink short burst in an uplink centric slot, wherein the slot position of the uplink short burst is located at any position of the uplink centric slot.

In another aspect, the disclosure provides a computer readable medium storing computer executable code for wireless communications by a UE. The computer readable medium may include code for receiving, at the UE, a PDCCH grant associated with a first transmission received from an eNB, wherein the PDCCH grant indicates a slot position of an uplink short burst, and code for transmitting the uplink short burst in an uplink centric slot, wherein the slot position of the uplink short burst is located at any position of the uplink centric slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to a position of a uplink short burst in NR communications. In one example, the uplink short burst may be dynamically located at any position (e.g., in any symbol) of an uplink centric slot. For example, a base station may dynamically provide the UE with an indication of one of plurality of slot positions allocated for the uplink short burst. Besides being located in any position, in another example, the uplink short burst may be transmitted in any position other than the end of an uplink centric slot. In a further additional example, the uplink short burst may be located at the beginning, or any other position, and also at the end, of the uplink centric slot (e.g., uplink short burst at two locations). This example provides for the uplink short burst to be transmitted at least twice within a slot to improve the chances of uplink short burst not encountering mixed interference. The eNB may notify the UE of the slot location of the uplink short burst in the uplink centric slot either explicitly, such as via an additional bit in the PDCCH, or implicitly, such as based on a position of the PDCCH.

Additional features of the present aspects are described in more detail below with respect to FIGS. 1-8.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
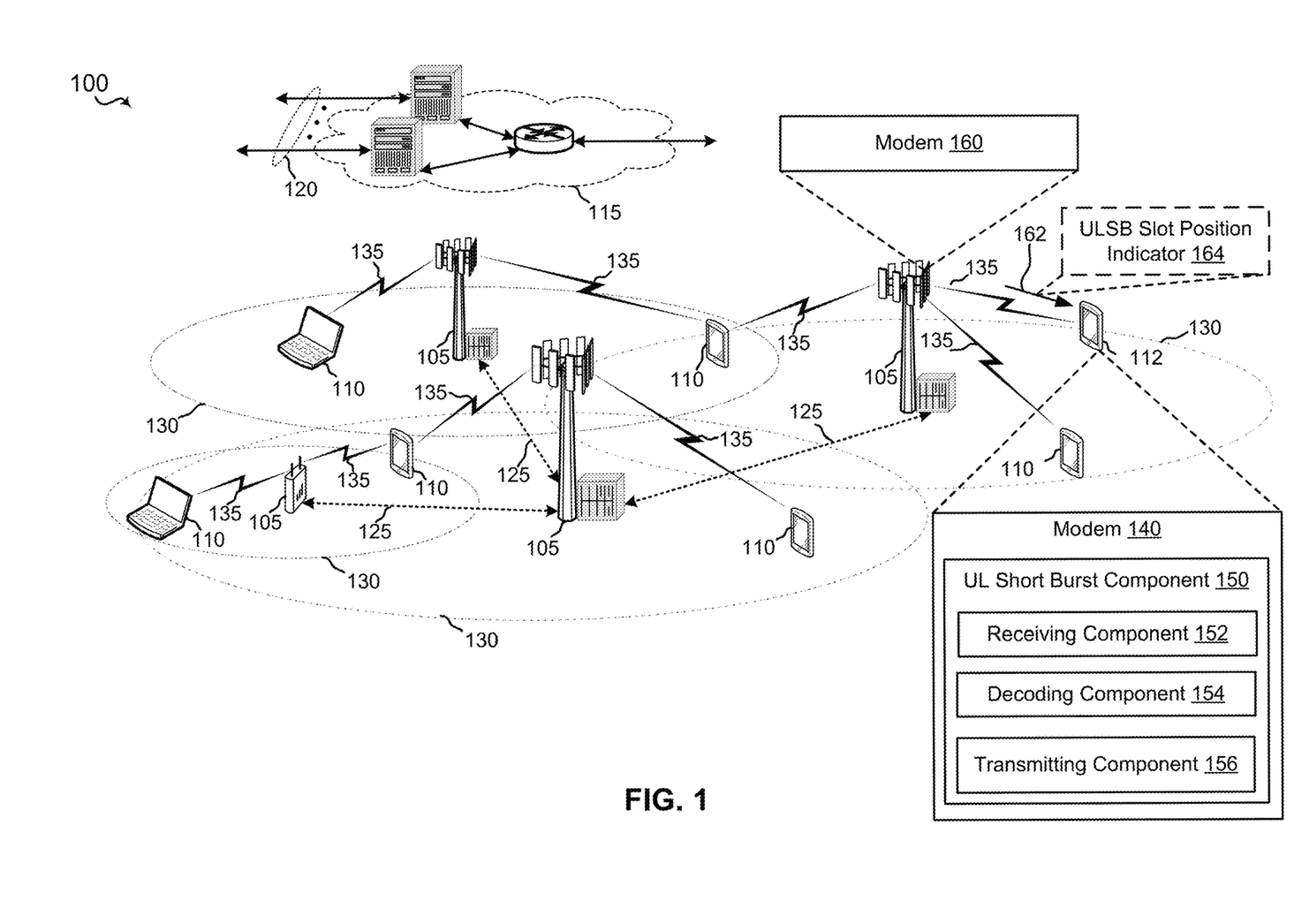
FIG. 1 is a schematic diagram of a wireless communication network including at least one user equipment (UE) having a UL short burst component in aspects of the present disclosure.

Referring to FIG. 1, in accordance with various aspects of the present disclosure, an example wireless communication network 100 includes at least one UE 112 with a modem 140 having a uplink short burst component 150 that manages configuring and/or transmission of an uplink short burst (ULSB) for wireless communications with eNB or base station 105. UE 112 may receive a transmission 162, e.g., a grant such as a PDCCH, from a modem 160 of a base station 105 that indicates a slot position of the uplink short burst. The indication, such as an uplink short burst slot position indicator 164, may be either explicit, such as via an additional bit in a grant, or implicit, such as based on a position of the grant in a downlink slot. Thus, UE 112 may transmit the uplink short burst in a dynamically variable, base-station-indicated position of an uplink centric slot based on the slot position indicated by base station 105.

The wireless communication network 100 may include one or more base stations 105, one or more UEs 112, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 112, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 112 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 112. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 112 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 112 with service subscriptions with the network provider. A femto cell may also cover a small geographic area (e.g., a home) and may provide restricted access and/or unrestricted access by UEs 112 having an association with the femto cell (e.g., in the restricted access case, UEs 112 in a closed subscriber group (CSG) of the base station 105, which may include UEs 112 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 112 and the base stations 105. The RRC protocol layer may also be used for core network 115 support of radio bearers for the user plane data. At the physical (PHY) layer, the transport channels may be mapped to physical channels.

The UEs 112 may be dispersed throughout the wireless communication network 100, and each UE 112 may be stationary or mobile. A UE 112 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 112 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 112 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 112 may be able to communicate with various types of base stations 105 and network equipment including macro eNBs, small cell eNBs, macro gNBs, small cell gNBs, relay base stations, and the like.

UE 112 may be configured to establish one or more wireless communication links 135 with one or more base stations 105. The wireless communication links 135 shown in wireless communication network 100 may carry uplink (UL) transmissions from a UE 112 to a base station 105, or downlink (DL) transmissions, from a base station 105 to a UE 112. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 112 may include multiple antennas for employing antenna diversity schemes to improve communication quality and reliability between base stations 105 and UEs 112. Additionally or alternatively, base stations 105 or UEs 112 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 112 may be configured with multiple downlink CCs and one or more uplink CCs for carrier aggregation. Carrier aggregation may be used with both FDD and TDD component carriers. The base stations 105 and UEs 112 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 112 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 112 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 112 operating according to the mmW technology may utilize beamforming in their transmissions to compensate for the extremely high path loss and short range.

In an aspect, an eNB 105 may schedule a plurality of UEs (or a plurality of groups of UEs), e.g., UE 112 and/or UE 112 in multi-user multiple-input and multiple-output (MU-MIMO) configuration using shared resources. The shared resources may be resource blocks (RBs) which include resource elements (REs) on which modulation symbols carrying data bits are mapped. The resources for the two different UEs (or groups of UEs) may be the same or may have some resources in common (e.g., overlapping resources). In such cases, rate matching may have to be performed at a receiver, e.g., at UE 112 (if eNB 105 is a transmitter) and/or eNB 105 (if UE 112 is a transmitter). The rate matching may have to be performed at the receiver as information bits received in a packet at the receiver may have to be mapped to the resources, e.g., modulated symbols, as data may not be transmitted only over all resources (e.g., data may be transmitted over some symbols only). For example, the number of bits the encoder outputs depends on the type of encoding and may not match the number of resource elements in a resource block.

Some parameters may impact rate matching behavior. For instance, such parameter may be numerology used for a signal/resource may affect rate matching behavior, e.g., tone or subcarrier spacing, cyclic prefix (CP) duration. For example, subcarrier spacing may be defined as the distance between two consecutive subcarriers in frequency domain, and may be 30 KHz, 60 KHz, 120 KHz, etc. Additional signaling may be needed to support dynamic or mixed numerology as the procedure for rate matching around reference signals has to be supported. In an additional aspect, such a parameter may also include a bandwidth of the signal/resource which could be a partial bandwidth of system bandwidth (e.g., sub-band, etc.) or radio resource control (RRC) configured bandwidth for rate matching purposes. In a further additional aspect, such a parameter may also include a location of the signal/resources, e.g., which symbol and/or how many symbols.

eNB 105 may indicate numerology 154 of the signal/resource to one or more UEs or to one or more groups of UEs. The indication of numerology 154 from eNB 105 assists in the rate matching or rate matching performed that may be performed at the receiver, e.g., UE 112. Additionally/optionally, the receiver may be eNB 105 if a UE is the transmitter, e.g., transmissions on the UL to eNB. eNB 105 may indicate numerology 154 to UEs via physical layer signaling (e.g., using a control channel), media access control-control element (MAC-CE) signaling, radio resource control (RRC) signaling, and/or any combination thereof.

eNB 105 may broadcast information, e.g., system information blocks (SIBs) and/or master information block (MIB), from eNB 105 using a fixed numerology or a small sub-set of numerologies. The receiving UEs, e.g., UE 112, decode the SIBs and/or MIB, perform the RACH procedure, and may receive/transmit RRC reconfiguration messages related to rate matching, etc.

In one implementation, eNB 105 may use a 60 KHz subcarrier spacing for transmission of control and/or user data to UEs, a first UE, e.g., UE 112 or a first group of UEs, and/or use a 120 KHz subcarrier spacing for transmission of control and/or user data to UEs, a second UE, e.g., UE 112 or a second group of UEs. eNB 105 may notify (e.g., indicate, signal, etc.) UE 112 via numerology 154 to perform rate matching around signal/resource element with 60 KHz subcarrier spacing. eNB 105 may further notify UE 112 to perform rate matching around signal/resource element with 120 KHz subcarrier spacing which may result in UE 112 performing rate matching with twice the number of symbols, as UE 112 is using symbols for a time duration which is half of the symbol duration of UE 112. In other words, UE 112 may perform rate matching around signal/resource element with a subcarrier spacing of 60 KHz for a time duration "$T_1$," and/or UE 112 may perform rate matching around signal/resource element with a subcarrier spacing of 120 KHz for a time duration "$2T_2$," wherein $2T_2=T_1$. This allows the signal/resource element that is rate matched around to be free from interference from data symbols sent to both UE 110 and UE 112. In some aspects, rate matching around signal/resource element transmitted to another UE may not be needed if mutual interference between the transmissions to the UEs is limited due to spatial separation between the signals/resource elements.

In one more implementation, eNB 105 may use a 60 KHz subcarrier spacing for data transmission, e.g., control data and/or user data, to a UE or a group of UEs. eNB 105 may dynamically update (e.g., revised, change, etc.) numerology 154, for example, for the user data portion, by changing subcarrier spacing to 120 KHz and notifying UE 112. eNB 105 may notify UE 112 about the updated numerology so that UE 112 may perform rate matching based on the new numerology (e.g., subcarrier spacing of 120 KHz). As described above, eNB 105 may dynamically notify UE 112 of the new numerology via physical layer signaling (e.g., using a control channel), media access control-control element (MAC-CE) signaling, radio resource control (RRC) signaling, and/or any combination thereof.

eNB 105 may notify UE 112 to perform rate matching in different ways. For example, in an aspect, eNB 105 may notify UE 112 to perform rate matching with the same amount of time duration. That is, when eNB 105 initially scheduled transmission of user data with 60 KHz subcarrier spacing, the REs for rate matching have a duration of 1 symbol corresponding to 60 KHz tone spacing. However, when eNB 105 dynamically updates the subcarrier spacing for user data to 120 KHz, the REs for rate-matching have a duration of 2 symbols corresponding to 120 KHz subcarrier spacing as the typical time duration of a symbol with 120 KHz subcarrier spacing is half the time duration of a corresponding symbol with 60 KHz subcarrier spacing. Additionally, eNB 105 may signal UE 112 to rate match REs with the same number of symbols. For example, when eNB 105 schedules user data for UE 112 with a subcarrier spacing of 60 KHz, the REs for rate matching have a duration of 1 symbol corresponding to 60 KHz subcarrier spacing. However, when eNB 105 dynamically updates the subcarrier spacing for user data to 120 KHz, the REs for performing rate-matching have a duration of 1 symbol corresponding to the 120 KHz subcarrier spacing (half the duration with 60 KHz subcarrier spacing).

eNB 105 relays numerology 154 to UEs. eNB 105 may reserve some bits to indicate numerology 154 to the UEs. A sub-set of bit values may be used to indicate a "default" numerology so that other additional information may carried in the bits. In an aspect, default numerology could be, for example, same numerology used by physical channels that are being rate-matched around the reserved REs (e.g., for transmission of RS).

Additionally, downlink rate matching scheme may be also used for uplink rate matching scheme. For example, when UE 112 transmits physical uplink shared channel (PUSCH) and/or control channel on the UL, UE 112 may signal to eNB 105 to perform rate matching around signal/REs similar to rate matching scheme used for the downlink. The signals/REs around which rate matching is performed may include resources used for a sounding reference signal (SRS), resources used for reference signal for uplink beam management, resources used for reference signal for uplink channel or interference sounding purposes, and/or resources used for forward compatibility purposes. Further, the signals transmitted in these resources could be signals from the UE performing the rate-matching or from other UEs. In other words, a UE may perform rate-matching around REs that are used for other purposes by either the same UE or by other UEs.

In one implementation, as OFDM is supported on the UL in addition to SC-FDM, DL rate matching scheme may be reused for both OFDM and SC-FDM waveform transmission on both downlink and uplink.

When an application running on a user equipment (UE) has delay-sensitive information (e.g., control and data information) for transmitting to an eNB, the UE has to wait for a uplink slot to transmit the information. This delay may affect performance of the application, UE, and/or the network. An UL short burst may be defined in both downlink centric and uplink centric slots. This allows the UE to transmit delay sensitive information, e.g., control data (e.g., ACK/NACK) or user data, without waiting for an UL slot. The UL short burst may be defined to include one or more of a sounding reference signal (SRS), a demodulation reference signal (DMRS), a physical uplink control channel (PUCCH), and/or a physical uplink shared channel (PUSCH).

Figure 2:
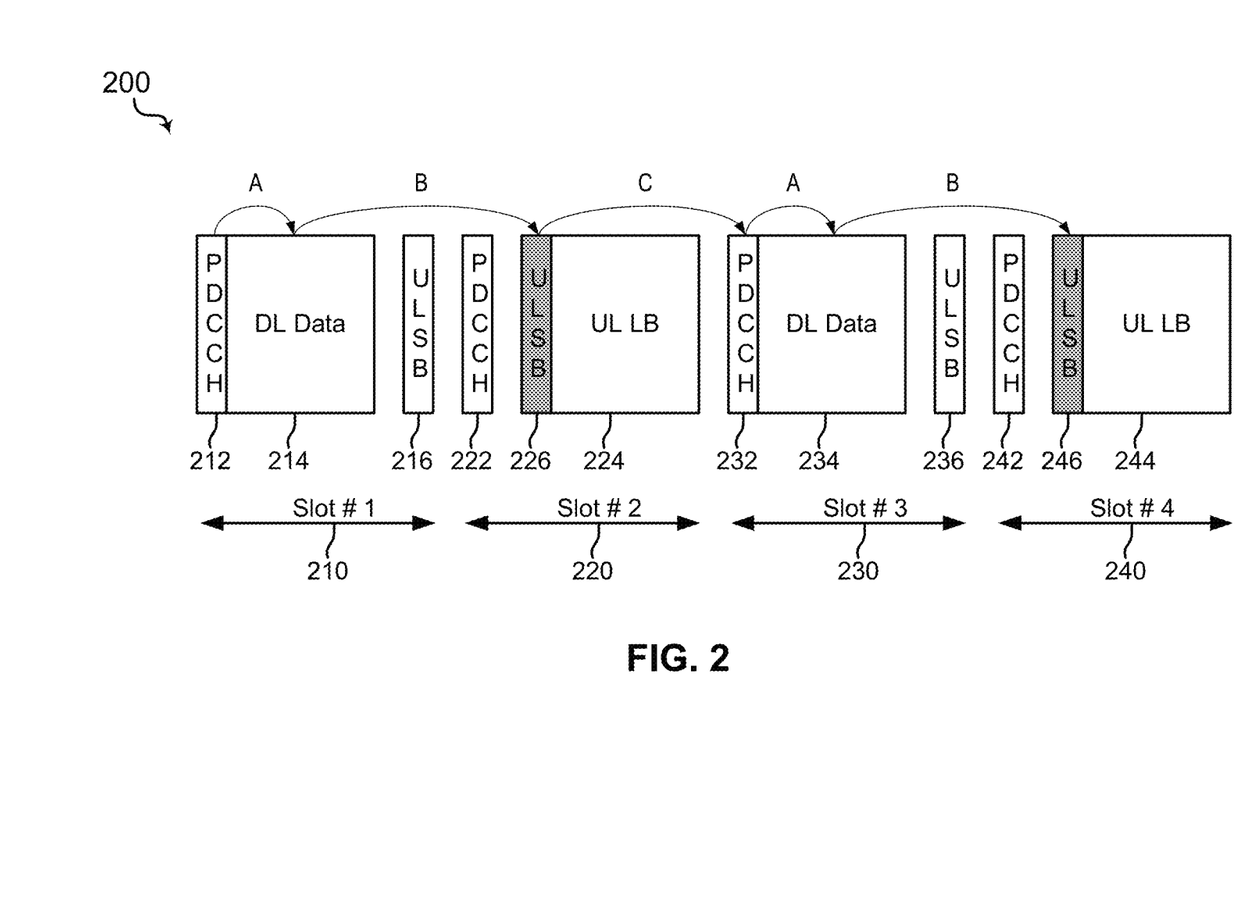
FIGS. 2, 3A, 3B, 4, and 5 are example designs of uplink short burst transmissions in aspects of the present disclosure.

FIG. 2 illustrates an example design of ULSB configuration 200 in multiple slots in aspects of the present disclosure, including: a first slot 210 that is a downlink centric slot having a PDCCH 212, DL data 214, and an ULSB 216; a second slot 220 that is an uplink centric slot having a PDCCH 222, an ULSB 226 and an uplink long burst (ULLB) 224; a third slot 230 that is a DL centric slot having a PDCCH 232, DL data 234, and an ULSB 236; and a fourth slot 240 that is an UL centric slot having a PDCCH 242, an ULSB 246, and an ULLB 244.

In one implementation, FIG. 2 illustrates a two hybrid automatic repeat request (HARQ) interlace transmission with the ULSB located at the beginning of the UL centric slot. For example, ULSB may be located or transmitted using a first symbol 226 (after PDCCH reception/decoding) of UL centric slot 220. In other words, ULSB is transmitted in a symbol prior to the uplink long burst (ULLB) 224 transmission in a UL centric slot. However, it should be noted, that the ULSB in a DL centric slot may still be transmitted in the last symbol of a DL centric slot. For example. ULSB may be transmitted using the last symbols 216 and 236 of DL centric slots 210 and 230, respectively, and the first symbols 226 and 246 of UL centric slots 220 and 240, respectively. As illustrated in FIG. 2, the reference "A" represents UE 112 receiving PDCCH grant (e.g., grants 212 and 232) from eNB 105 and starting of DL data decoding, "B" represents decoding of DL data (e.g., 214 and 234) and sending of ACK/NACK in ULSB (e.g., 226 and 246), and/or "C" represents eNB receiving ACK/NACK (e.g., 226 and 246) and sending new grants (e.g., 232) for either re-transmission (in response to a NACK) and/or a new transmission of DL data (e.g., 234; in response to an ACK). This representation/description of A, B, and/or C is valid for other figures as well.

The ULSB design 200 illustrated in FIG. 2 with ULSB at the end of DL centric slot supports self-contained transmissions where the acknowledgement (ACK) to the DL data transmitted from eNB 105 may be transmitted from UE 112 in the ULSB in the same slot. Further, a ULSB at the end of the DL centric slot allows the HARQ timeline to be separated from DL/UL configuration as UE 112 may not have to wait for a UL centric slot to transmit the ACK. Furthermore, the transmission of ULSB at the beginning of ULLB transmission allows easier timelines for UE 112 and eNB 105 with two HARQ interlaces when compared to the ULSB design with the ULSB located at the end of the UL centric slot. This design/structure with ULSB before ULLB may also allow UE 112 to transmit clear to send (CTS) messages in ULSB transmitted in symbol 226 for side link or device-to-device (D2D) communications. Additionally, this structure provides additional processing time for demodulation reference signal (DMRS) and data transmission at the UE.

Figure 3A:
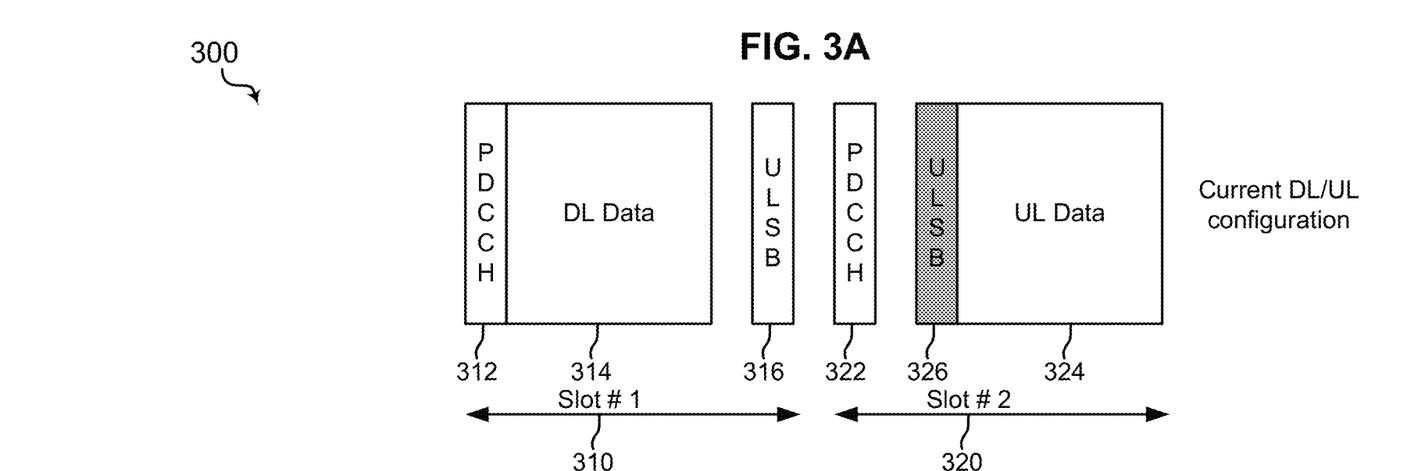
Figure 3B:
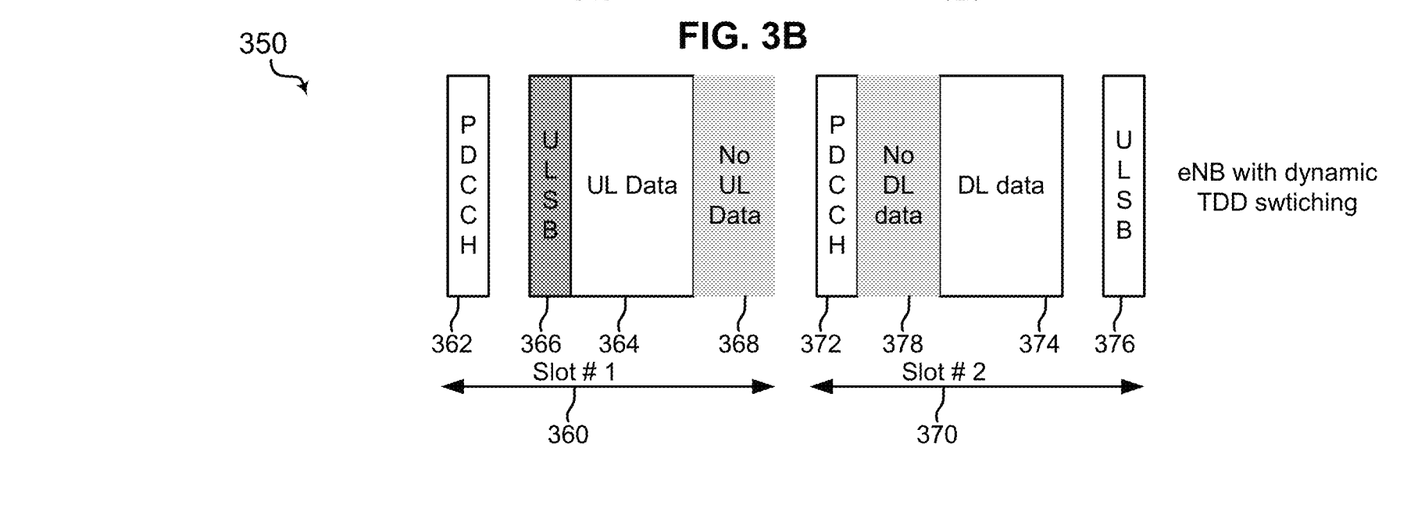

FIGS. 3A-3B illustrate additional example designs of ULSB in aspects of the present disclosure, including: in FIG. 3A, an ULSB configuration 300 having a first slot 310 that is a downlink centric slot having a PDCCH 312, DL data 314, and an ULSB 316; and a second slot 320 that is an uplink centric slot having a PDCCH 322, an ULSB 326 and an uplink data 324; and, in FIG. 3B, an ULSB configuration 350 including a first slot 360 that is an uplink centric slot having a PDCCH 362, an ULSB 366, uplink data 364, and a blanked area 368 of no UL data to indicate a switch to a DL centric slot; and a second slot 370 that is a downlink centric slot having a PDCCH 372, a blanked area 378 of no DL data to indicate a switch to an UL centric slot, DL data 374, and an ULSB 376.

Referring to FIG. 3A, an example design of an ULSB configuration 300 is illustrated in which ULSB is transmitted in the beginning of UL centric slot. In one implementation, ULSB may be transmitted using a first symbol 326 (after PDCCH reception) of UL centric slot 320, similar to the design described in detail in reference to FIG. 2 above.

For example, when a plurality of cells in a region use the same DL/UL configurations, mixed interference between cells is not generally present. However, when a cell dynamically switch one DL centric slot to UL centric slot or vice versa while neighboring cells are still maintaining the original DL/UL configurations, a mixed interference scenario may occur. For example, a UE in a serving cell with a DL configuration may not only receive signals from its serving cell but also signals from other UEs in the neighboring cells with UL configurations. Additionally, a cell with a UL configuration may not only receive signals from its own UE but also signals from neighbor cells with DL configuration. Such mixed interference scenarios are undesirable for ULSB, specifically, as ULSB typically carrier relatively important information, e.g., ACK/NACKs. Therefore, in one implementation, to avoid mixed interference to neighboring cells' ULSB, a cell that does dynamic TDD switching may blank part of its UL or DL transmission that may interfere with neighbor cell ULSB as illustrated in detail in reference to FIG. 3B.

Referring to FIG. 3B, an example design of ULSB configuration 350 is illustrated in which no data transmissions are made in a UL centric slot and/or a DL centric slot that align with ULSB of DL or UL centric slots of other eNBs. In one implementation, no data is transmitted using symbols 368 and 378 of UL centric slot 360 and DL centric slot 370 to avoid mixed interference with uplink short bursts transmitted using symbols 316 and 326 of FIG. 3A. In an aspect, for example, two symbols may be blanked to avoid mixed interference, although any other number of symbols may be blanked depending on the application.

Figure 4:
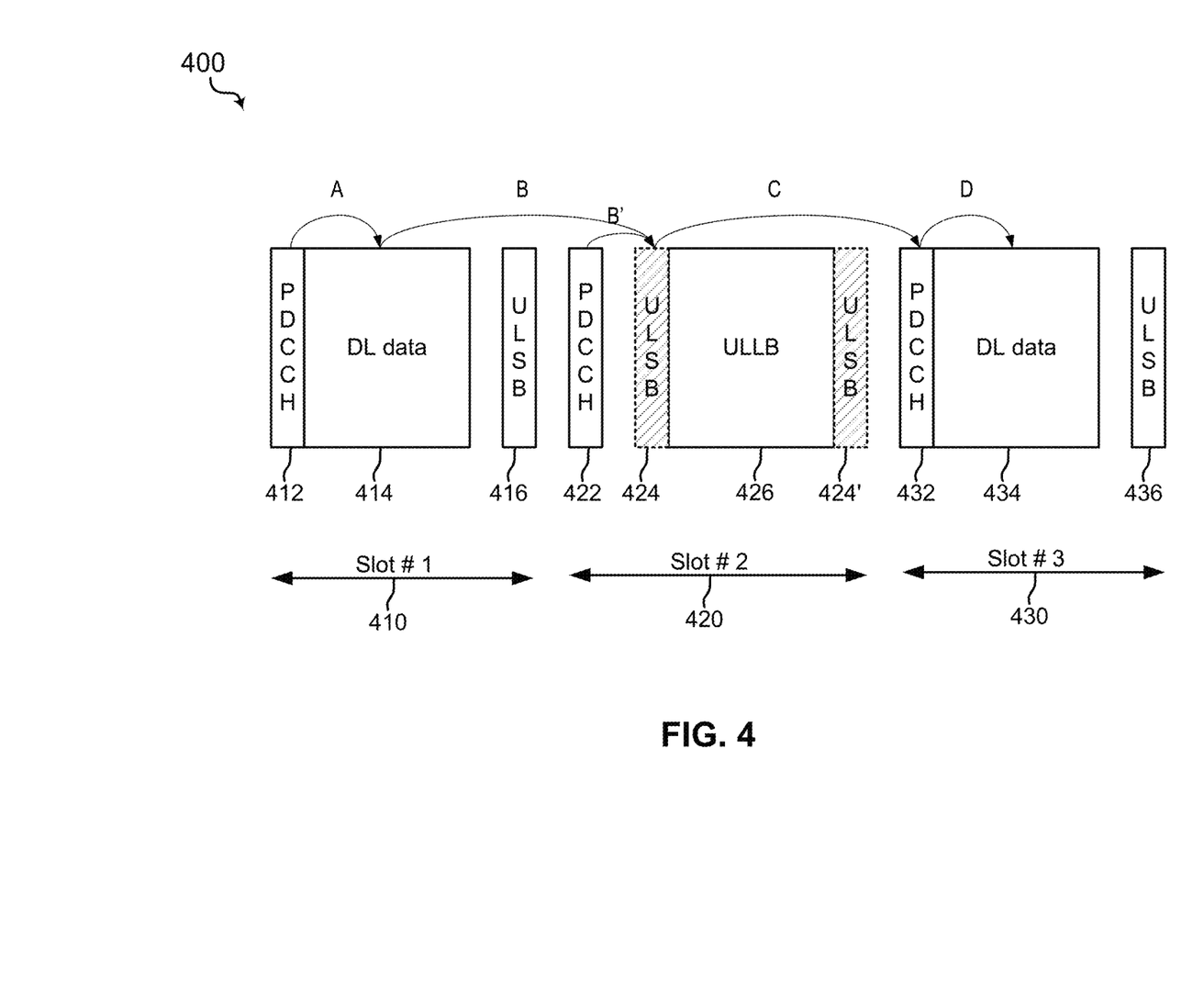

FIG. 4 illustrates an additional example design of ULSB 400 in aspects of the present disclosure, including: a first slot 410 that is a downlink centric slot having a PDCCH 412, DL data 414, and an ULSB 416; a second slot 420 that is an uplink centric slot having a PDCCH 422, an optional front ULSB 424, an ULLB 426, and an optional end ULSB 424'; and, a third slot 430 that is a DL centric slot having a PDCCH 432, DL data 434, and an ULSB 436.

In one implementation, a ULSB may be transmitted in the first symbol or the last symbol of a UL centric slot. For example, ULSB may be transmitted in the first symbol 424 or last symbol 424' of UL centric slot 420. eNB 105 may notify UE 112 the location of the ULSB via an additional bit transmitted with a physical downlink control channel (PDCCH). The value of the bit may indicate whether the ULSB is located at the beginning or the end of the UL centric slot.

It should be noted that the UE decodes PDCCH transmitted in the symbol(s) 424 first as the additional bit indicates the location of the ULSB. Further, if the PDCCH does not include the additional bit, UE 112 may interpret that the ULSB is located at the last symbol of the UL centric slot, as a default configuration. Alternatively, UE 112 may interpret that the ULSB is located at the first symbol of the UL centric slot if the PDCCH does not include the additional bit. In one implementation, to minimize/avoid mixed interference to neighbor cells' ULSB, eNB 105 that performs dynamic TDD switching may blank part of its UL or DL transmission that interfere with ULSB of a neighbor cell.

In one implementation, the last symbol of the UL centric slot may be used for ULSB if that slot is possible to be configured for dynamic TDD switching for serving eNB or neighbor eNB. Additionally, the first symbol of the UL centric slot may be used for transmitting ULSB, when dynamic TDD is not allowed in that slot. In another implementation, when ULSB located at the beginning, ULSB may transmit clear to send (CTS) messages in side link communications, e.g., device-to-device, D2D, communications. In another implementation, when ULSB is located at the beginning, ULSB may be used for transmitting CTS and ACK/NACK messages from the UE to the eNB.

Figure 5:
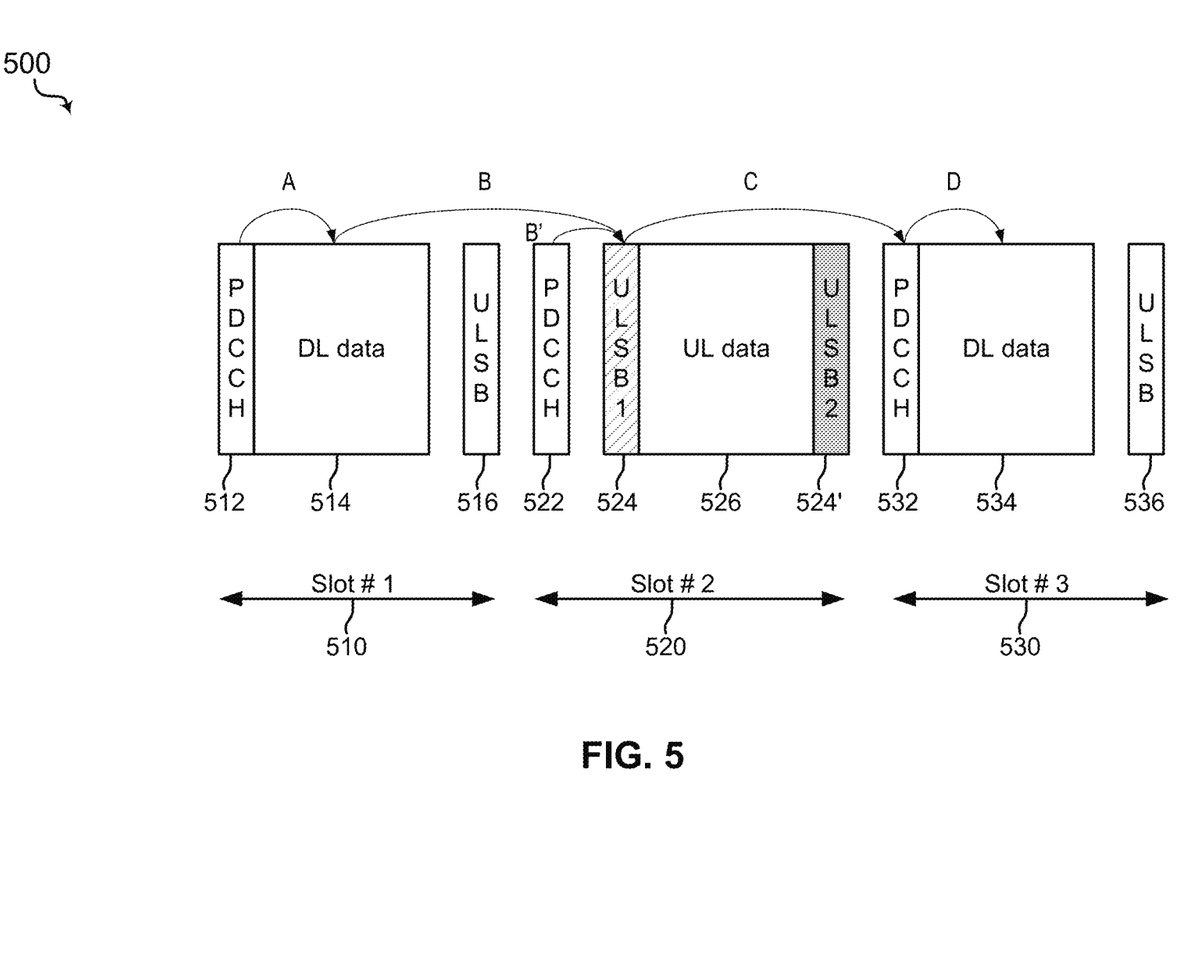

FIG. 5 illustrates an example design of ULSB 500 in aspects of the present disclosure, including: a first slot 510 that is a downlink centric slot having a PDCCH 512, DL data 514, and an ULSB 516; a second slot 520 that is an uplink centric slot having a PDCCH 522, an additional ULSB 524, an ULLB 526, and an ULSB 524'; and, a third slot 530 that is a DL centric slot having a PDCCH 532, DL data 534, and an ULSB 536.

In one implementation, an ULSB, e.g., USBL2, is transmitted in the last symbol of a UL centric slot. For example, ULSB2 is transmitted in the last symbol 524' of UL centric slot 520. An additional ULSB, e.g., ULSB1, may be transmitted in the first symbol 524 of UL centric slot. To avoid mixed interference with the ULSB transmissions of neighboring cells, eNB 105 that performs dynamic TDD switching may blank (e.g., no data transmission) part of its UL or DL transmission that may interfere with ULSB of a neighbor cell. Additionally ULSB1 may be transmitted when dynamic time division duplex (TDD) is not allowed. That is, when dynamic TDD is not allowed, ULSB1 may be transmitted in the first symbol 524 of UL centric slot 520.

The transmission of ULSB1 in the first symbol 524 of UL centric slot 520 may be indicated, e.g., explicitly, via an additional bit transmitted with the PDCCH or implicitly based on a position of the PDCCH.

This procedure of transmitting dual ULSBs from a UE improves the chances of at least one ULSB being transmitted to eNB 105 without being subjected to mixed interference. eNB 105 may notify UE 112 the presence of the ULSB at the beginning via an additional bit transmitted with a physical downlink control channel (PDCCH). The value of the bit may indicate whether the ULSB is located at the beginning of the UL centric slot. Further, if the PDCCH does not include the additional bit, UE 112 may interpret that the ULSB in the beginning is not present in the UL centric slot as default. Alternatively, UE 112 may interpret that the ULSB in the beginning is present in the UL centric slot if the PDCCH does not include the additional bit.

In one implementation, ULSB1 524 may transmit a clear to send (CTS) message in side link communications, e.g., device-to-device, D2D, communications. In another implementation, ULSB1 may be used for transmitting CTS and ACK/NACK messages from the UE to the eNB.

Figure 6:
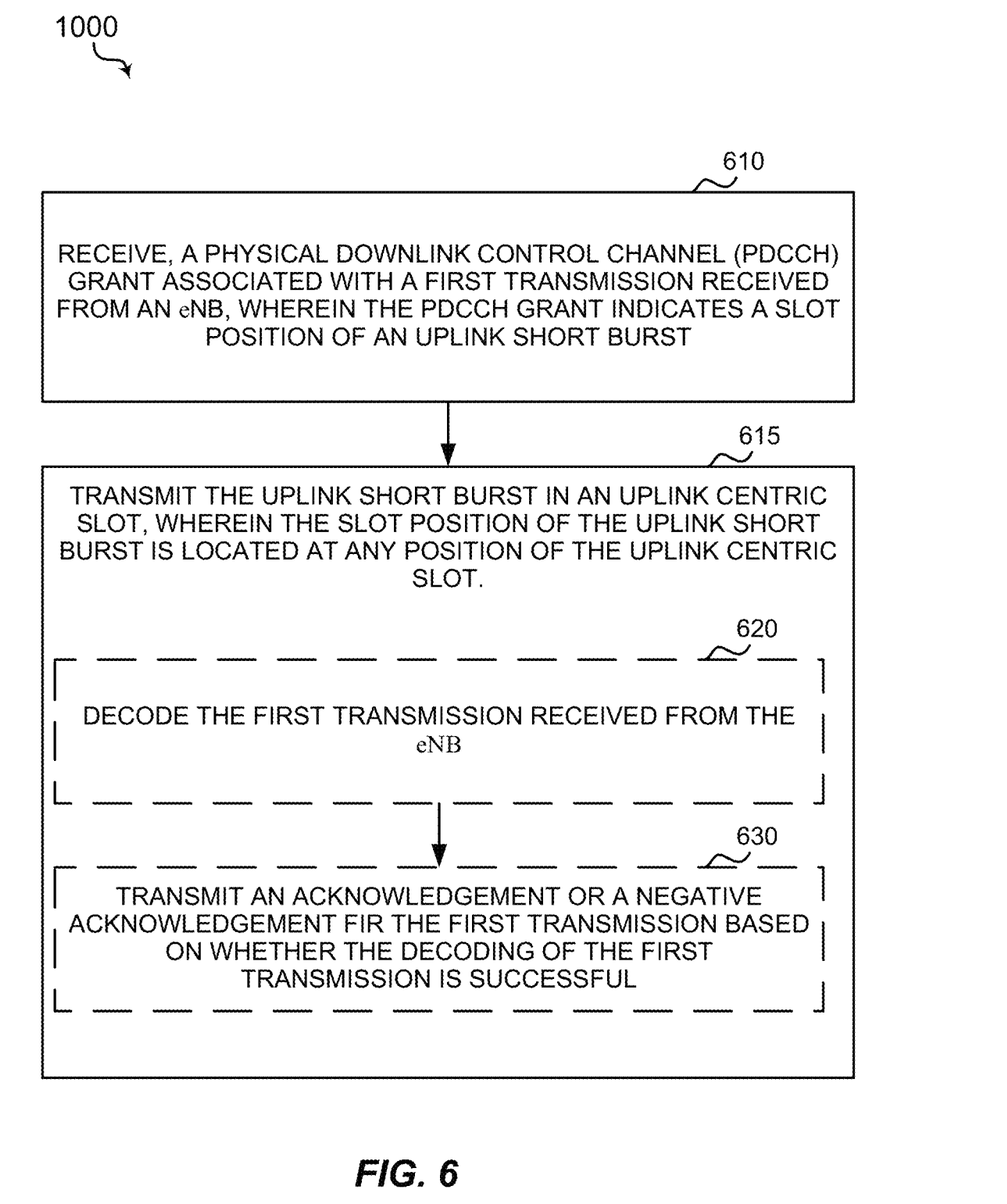
FIG. 6 is a flow diagram of an example of a method of configuring a uplink short burst in wireless communications in aspects of the present disclosure.

Referring to FIG. 6, for example, a method 600 of wireless communication operating in UE 110 according to the above-described aspects for configuring and/or transmitting uplink short burst includes one or more of the herein-defined actions.

At block 610, method 600 includes receiving, at a user equipment (UE), a physical downlink control channel (PDCCH) grant associated with a first transmission received from an eNB, wherein the PDCCH grant indicates a slot position of an uplink short burst. For instance, in an aspect, UE 112 may execute UL short burst component 150 and/or receiving component 152 to receive a physical downlink control channel (PDCCH) grant associated with a first transmission received from an eNB, wherein the PDCCH grant indicates a slot position of an uplink short burst. The slot position may be a selected one of a plurality of positions within the slot, e.g., at any position. For example, in some cases, the PDCCH may include an explicit indicator, such as a value of one or more bits of a downlink control information (DCI), to signal the ULSB slot position. Further, for example, in other cases, the PDCCH may provide an implicit indication, such as a position of the PDCCH, from which the UE 112 may infer the ULSB slot position.

At block 615, method 600 includes transmitting the uplink short burst of a uplink centric slot, wherein the slot position of the uplink short burst is located at any position of the uplink centric slot. For example, in an aspect, UE 112 may execute UL short burst component 150 and/or transmitting component 156 to transmit the uplink short burst in at least one position as indicated by the eNB, such as any position of the slot identified by an implicit or explicit uplink short burst slot position indicator 164. The UE may transmit a response including a variety of control information in an uplink short burst. Control information may include an acknowledgment or negative acknowledgment as discussed in greater detail with reference to block 630, channel status information (CSI), scheduling requests, and small data bursts. In various aspects, the uplink short burst response may be self-contained, including an HARQ and an ACK. Various aspects may include transmitting the uplink short burst in any symbol of the uplink centric slot, although this implementation may also include transmitting in any symbol and additionally in the end symbol. The assigned symbol may be determined by the PDCCH or other indicator received in the downlink centric slot.

In some aspects, transmitting the response in block 615 may include the additional operations illustrated in blocks 620 and 630.

At block 620, method 600 includes decoding, at the UE, the first transmission received from the eNB. For instance, in an aspect, UE 112 may execute UL short burst component 150 and/or decoding component 154 to decode the first transmission received from the eNB. For example, UE 112 may decode transmission 162, e.g., the PDCCH, and/or an implicit or explicit uplink short burst slot position indicator 164.

At block 630, method 600 transmitting an acknowledgement (ACK) or a negative acknowledgement (NACK) for the first transmission based on whether the decoding of the first transmission is successful, wherein the ACK or the NACK is transmitted in the uplink short burst of a uplink centric slot, and wherein the uplink short burst is located at a beginning of the uplink centric slot or at the beginning and an ending of the uplink centric slot. For instance, in an aspect, UE 112 may execute UL short burst component 150 and/or transmitting component 156 to transmit an acknowledgement (ACK) for the first transmission when the decoding of the first transmission is successful and a NACK message when the decoding of the first transmission is not successful. In response to receiving an ACK/NACK from UE 112, eNB 105 may send a new PDCCH grant for re-transmission when eNB 105 received a NACK or new transmission of DL data when eNB received an ACK.

Figure 7:
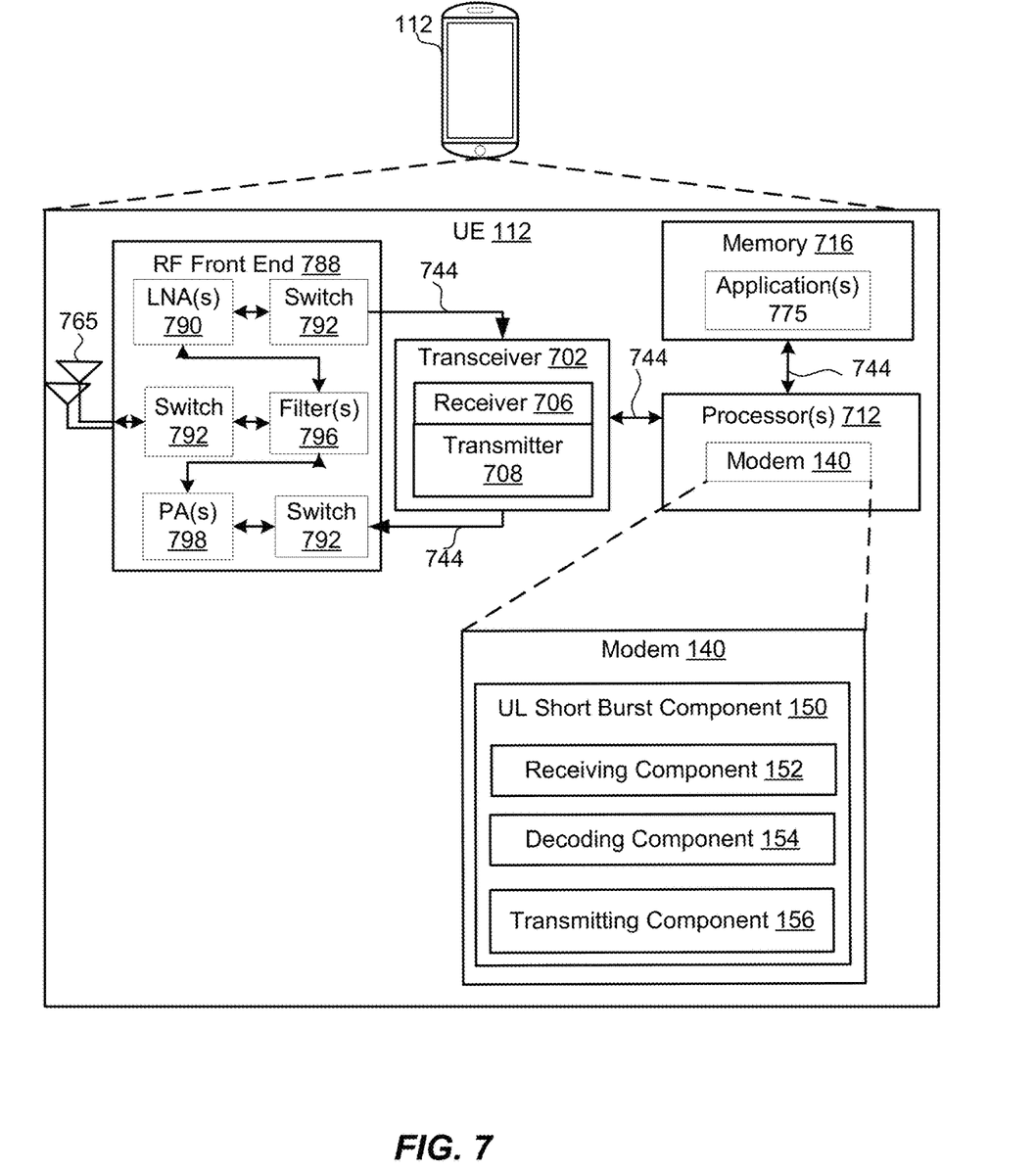
FIG. 7 is a schematic diagram of example components of the UE of FIG. 1.

Referring to FIG. 7, one example of an implementation of UE 112 may include a variety of components, some of which have already been described above, but including components such as one or more processors 712, memory 716, and transceiver 702 in communication via one or more buses 744, which may operate in conjunction with modem 140 and uplink short burst component 150 to enable one or more of the functions described herein related to rate matching and signaling. Further, the one or more processors 712, modem 714, memory 716, transceiver 702, RF front end 788 and one or more antennas 786, may be configured to support voice and/or data calls (simultaneously or non-simultaneously) in one or more radio access technologies.

In an aspect, the one or more processors 712 can include a modem 714 that uses one or more modem processors. The various functions related to uplink short burst component 150 may be included in modem 140 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 140 associated with rate matching and signaling component 150 may be performed by transceiver 702.

Also, memory 716 may be configured to store data used herein and/or local versions of applications 775 or uplink short burst component 150 and/or one or more of its subcomponents being executed by at least one processor 712. Memory 716 can include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining uplink short burst component 150 and/or one or more of its subcomponents, and/or data associated therewith, when UE 112 is operating at least one processor 712 to execute rate matching and signaling component 150 and/or one or more of its subcomponents.

Transceiver 702 may include at least one receiver 706 and at least one transmitter 708. Receiver 706 may include hardware, firmware, and/or software code executable by a processor for receiving data, the code comprising instructions and being stored in a memory (e.g., computer-readable medium). Receiver 706 may be, for example, a radio frequency (RF) receiver. In an aspect, receiver 706 may receive signals transmitted by at least one base station 105. Additionally, receiver 706 may process such received signals, and also may obtain measurements of the signals, such as, but not limited to, Ec/Io, SNR, RSRP, RSSI, etc. Transmitter 708 may include hardware, firmware, and/or software code executable by a processor for transmitting data, the code comprising instructions and being stored in a memory (e.g., computer-readable medium). A suitable example of transmitter 708 may including, but is not limited to, an RF transmitter.

Moreover, in an aspect, UE 112 may include RF front end 788, which may operate in communication with one or more antennas 765 and transceiver 702 for receiving and transmitting radio transmissions, for example, wireless communications transmitted by at least one base station 105 or wireless transmissions transmitted by UE 112. RF front end 788 may be connected to one or more antennas 765 and can include one or more low-noise amplifiers (LNAs) 790, one or more switches 792, one or more power amplifiers (PAs) 798, and one or more filters 796 for transmitting and receiving RF signals.

In an aspect, LNA 790 can amplify a received signal at a desired output level. In an aspect, each LNA 790 may have a specified minimum and maximum gain values. In an aspect, RF front end 788 may use one or more switches 792 to select a particular LNA 790 and its specified gain value based on a desired gain value for a particular application.

Further, for example, one or more PA(s) 798 may be used by RF front end 788 to amplify a signal for an RF output at a desired output power level. In an aspect, each PA 798 may have specified minimum and maximum gain values. In an aspect, RF front end 788 may use one or more switches 792 to select a particular PA 798 and its specified gain value based on a desired gain value for a particular application.

Also, for example, one or more filters 796 can be used by RF front end 788 to filter a received signal to obtain an input RF signal. Similarly, in an aspect, for example, a respective filter 796 can be used to filter an output from a respective PA 798 to produce an output signal for transmission. In an aspect, each filter 796 can be connected to a specific LNA 790 and/or PA 798. In an aspect, RF front end 788 can use one or more switches 792 to select a transmit or receive path using a specified filter 796, LNA 790, and/or PA 798, based on a configuration as specified by transceiver 702 and/or processor 712.

As such, transceiver 702 may be configured to transmit and receive wireless signals through one or more antennas 765 via RF front end 788. In an aspect, transceiver may be tuned to operate at specified frequencies such that UE 112 can communicate with, for example, one or more base stations 105 or one or more cells associated with one or more base stations 105. In an aspect, for example, modem 140 can configure transceiver 702 to operate at a specified frequency and power level based on the UE configuration of the UE 112 and the communication protocol used by modem 140.

In an aspect, modem 140 can be a multiband-multimode modem, which can process digital data and communicate with transceiver 702 such that the digital data is sent and received using transceiver 702. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 112 (e.g., RF front end 788, transceiver 702) to enable transmission and/or reception of signals from the network based on a specified modem configuration. In an aspect, the modem configuration can be based on the mode of the modem and the frequency band in use. In another aspect, the modem configuration can be based on UE configuration information associated with UE 112 as provided by the network during cell selection and/or cell reselection.

Figure 8:
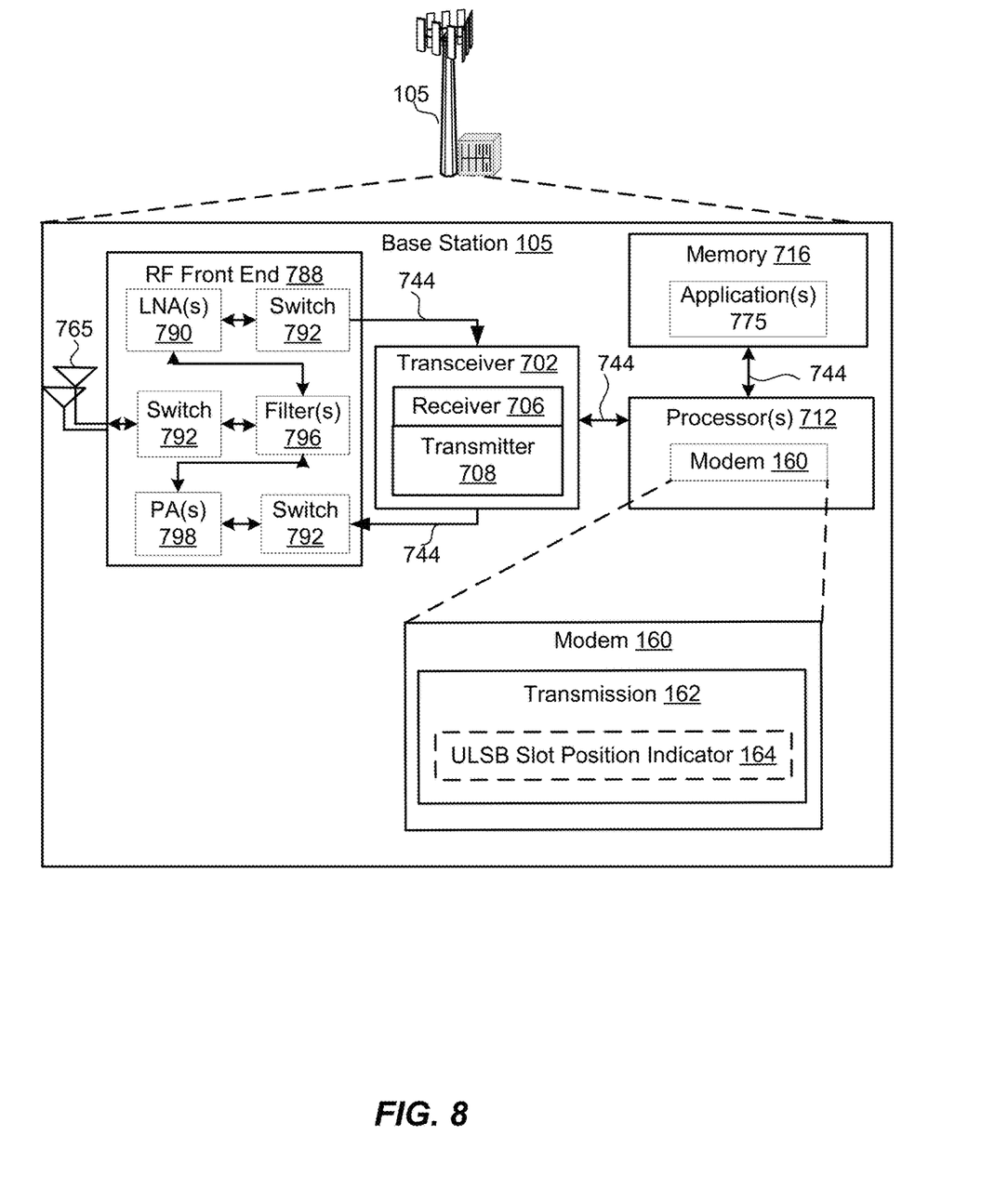
FIG. 8 is a schematic diagram of example components of the base station of FIG. 1.

Referring to FIG. 8, one example of an implementation of base station 105 may include a variety of components, some of which have already been described above, but including components such as one or more processors 712 and memory 716 and transceiver 702 in communication via one or more buses 744, which may operate in conjunction with modem 160 to send transmission 162, which may include an implicit or explicit uplink short burst slot position indicator 164 to enable one or more of the functions described herein. Moreover, modem 160 may receive, decode, and process the ULSB transmitted by UE 112.

The transceiver 702, receiver 706, transmitter 708, one or more processors 712, memory 716, applications 775, buses 744, RF front end 788, LNAs 790, switches 792, filters 796, PAs 798, and one or more antennas 765 may be the same as or similar to the corresponding components of UE 112, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of configuring a uplink short burst in wireless communications, comprising:
   receiving, at a user equipment (UE), a physical downlink control channel (PDCCH) grant associated with a first transmission received from a base station, wherein the PDCCH grant indicates a symbol position within an uplink centric slot of an uplink short burst; and
   transmitting the uplink short burst in the uplink centric slot, wherein the slot symbol position of the uplink short burst is located at any symbol position of the uplink centric slot.

2. The method of claim 1, wherein the PDCCH grant includes an explicit indicator of the symbol position in the uplink centric slot.

3. The method of claim 1, further comprising inferring the slot symbol position in the uplink centric slot from an implicit indicator related to the PDCCH grant.

4. The method of claim 1, further comprising transmitting an additional uplink short burst at the end of the uplink centric slot.

5. The method of claim 1, further comprising:
   decoding, at the UE, the first transmission received from the base station; and
   wherein transmitting the uplink short burst includes transmitting an acknowledgement (ACK) or a negative acknowledgement (NACK) for the first transmission based on whether the decoding of the first transmission is successful.

6. The method of claim 1, wherein transmitting the uplink short burst includes transmitting one or more of channel state information (CSI), scheduling request, or received signal strength indictor (RSSI) channel information.

7. The method of claim 1, wherein transmitting the uplink short burst includes transmitting a self-contained transmission including an acknowledgement (ACK) and a hybrid automatic repeat request (HARQ).

8. The method of claim 1, wherein transmitting the uplink short burst includes transmitting a two hybrid automatic repeat request (HARQ) interlace transmission.

9. An apparatus for configuring a uplink short burst in wireless communications, comprising:
   a transceiver;
   a memory;
   a processor coupled to the transceiver and the memory and configured to:
      receive, via the transceiver, a physical downlink control channel (PDCCH) grant associated with a first transmission received from a base station, wherein the PDCCH grant indicates a slot symbol position within an uplink centric slot of an uplink short burst; and
      transmit, via the transceiver, the uplink short burst in gtA uplink centric slot, wherein the symbol position of the uplink short burst is located at any symbol position of the uplink centric slot.

10. The apparatus of claim 9, wherein the PDCCH grant includes an explicit indicator of the symbol position in the uplink centric slot.

11. The apparatus of claim 9, wherein the processor is further configured to infer the symbol position from an implicit indicator related to the PDCCH grant.

12. The apparatus of claim 9, wherein the processor is further configured to transmit, via the transceiver, an additional uplink short burst at the end of the uplink centric slot.

13. The apparatus of claim 9, wherein the processor is further configured to:
   decode the first transmission received from the base station; and
   transmit, via the transceiver, the uplink short burst including an acknowledgement (ACK) or a negative acknowledgement (NACK) for the first transmission based on whether the decoding of the first transmission is successful.

14. The apparatus of claim 9, wherein the processor is further configured to transmit, via the transceiver, the uplink short burst including one or more of channel state information (CSI), a scheduling request, or received signal strength indictor (RSSI) channel information.

15. The apparatus of claim 9, wherein the processor is further configured to transmit, via the transceiver, the uplink short burst in a self-contained transmission including an acknowledgement (ACK) and a hybrid automatic repeat request (HARQ).

16. The apparatus of claim 9, wherein the processor is further configured to transmit, via the transceiver, the uplink short burst in a two hybrid automatic repeat request (HARQ) interlace transmission.

17. The apparatus of claim 9, wherein the processor is further configured such that receiving the PDCCH includes receiving, via the transceiver, an indicator providing a transmission position of the uplink short burst in the uplink centric slot.

18. A non-transitory computer readable medium having stored thereon code for configuring a uplink short burst in wireless communications, comprising:
code for receiving a physical downlink control channel (PDCCH) grant associated with a first transmission received from a base station, wherein the PDCCH grant indicates a symbol position within an uplink centric slot of an uplink short burst; and
code for transmitting the uplink short burst in the uplink centric slot, wherein the symbol position of the uplink short burst is located at any symbol position of the uplink centric slot.

19. The non-transitory computer readable medium of claim 18, wherein the PDCCH grant includes an explicit indicator of the symbol position in the uplink centric slot.

20. The non-transitory computer readable medium of claim 18, further comprising code for inferring the symbol position in the uplink centric slot from an implicit indicator related to the PDCCH grant.

21. The non-transitory computer readable medium of claim 18, further comprising code for transmitting an additional uplink short burst at the end of the uplink centric slot.

22. The non-transitory computer readable medium of claim 18, further comprising:
code for decoding, at the UE, the first transmission received from the base station; and
wherein the code for transmitting the uplink short burst includes code for transmitting an acknowledgement (ACK) or a negative acknowledgement (NACK) for the first transmission based on whether a decoding of the first transmission is successful.

23. The non-transitory computer readable medium of claim 18, wherein code for transmitting the response includes code for transmitting one or more of channel state information (CSI), scheduling request, or received signal strength indictor (RSSI) channel information.

24. The non-transitory computer readable medium of claim 18, wherein code for transmitting the uplink short burst includes code for transmitting a self-contained transmission including an acknowledgement (ACK) and a hybrid automatic repeat request (HARQ).

25. The non-transitory computer readable medium of claim 18, wherein code for transmitting the response includes code for transmitting a two hybrid automatic repeat request (HARQ) interlace transmission.

26. An apparatus for configuring a uplink short burst in wireless communications, comprising
means for receiving a physical downlink control channel (PDCCH) grant associated with a first transmission received from a base station, wherein the PDCCH grant indicates symbol position within an uplink centric slot of an uplink short burst; and
means for transmitting the uplink short burst in the uplink centric slot, wherein the symbol position of the uplink short burst is located at any symbol position of the uplink centric slot.

27. The apparatus of claim 26, wherein the PDCCH grant includes an explicit indicator of the symbol position in the uplink centric slot, or wherein the apparatus further comprises means for inferring the symbol position in the uplink centric slot from an implicit indicator related to the PDCCH grant.

28. The apparatus of claim 26, further comprising means for transmitting an additional uplink short burst at the end of the uplink centric slot.

29. The apparatus of claim 26, further comprising:
means for decoding, at the UE, the first transmission received from the base station; and
wherein the means for transmitting includes means for transmitting an acknowledgement (ACK) or a negative acknowledgement (NACK) for the first transmission based on whether the decoding of the first transmission is successful.

30. The apparatus of claim 26, wherein means for transmitting includes means for transmitting one or more of channel state information (CSI), a scheduling request, or received signal strength indictor (RSSI) channel information.

* * * * *

UNITED STATES PATENT AND TRADEMARK OFFICE
CERTIFICATE OF CORRECTION

| | |
|---|---|
| PATENT NO. | : 10,798,703 B2 |
| APPLICATION NO. | : 15/850577 |
| DATED | : October 6, 2020 |
| INVENTOR(S) | : Renqiu Wang et al. |

It is certified that error appears in the above-identified patent and that said Letters Patent is hereby corrected as shown below:

In the Claims

Claim 9, Line 13 delete "gtA" and substitute therefor -- the --.

Signed and Sealed this
Tenth Day of September, 2024

Katherine Kelly Vidal
*Director of the United States Patent and Trademark Office*